Feb. 23, 1943.  R. O. SMITH  2,312,271
METHOD OF LOCATING SUBTERRANEAN PETROLEUM DEPOSITS
Filed June 22, 1939  2 Sheets-Sheet 1

ROBERT O. SMITH,
INVENTOR.

BY Cecil L. Wood
ATTORNEY

Feb. 23, 1943.   R. O. SMITH   2,312,271

METHOD OF LOCATING SUBTERRANEAN PETROLEUM DEPOSITS

Filed June 22, 1939   2 Sheets-Sheet 2

ROBERT O. SMITH,
INVENTOR.

BY
ATTORNEY.

Patented Feb. 23, 1943

2,312,271

UNITED STATES PATENT OFFICE 2,312,271

METHOD OF LOCATING SUBTERRANEAN PETROLEUM DEPOSITS

Robert O. Smith, Fort Worth, Tex.

Application June 22, 1939, Serial No. 280,431

2 Claims. (Cl. 23—230)

This invention relates to a geophysical science applied to geological surveys for the study of subsurface formations, such as faulting, folding, salt domes, and the like, and it has particular reference to a method of detecting such subsurface abnormalities through the examination and analysis of samples of surface or near-surface soils for solid or semi-solid hydrocarbon quantitatives which latter I have found are indicative of the presence of deposits of crude oil, or petroleum, in geological formations the accumulation of which are, so far as at present known, associated with structural faults or other geological anomalies. In carrying out my invention the samples should be systematically selected over a predetermined survey or reconnaissance and taken at definitely measured intervals, preserved and finally subjected preferably to chemical processes of analysis to determine their hydrocarbon contents, the resultant reading being then recorded graphically on charts for ultimate interpretations and coordinated with a map outlining the area under examination.

An object of the invention resides in the provision of a method of detecting the presence of petroleum deposits in areas suspected of presenting petroleum exploration possibilities and particularly where previous geological surveys have indicated geological structures favorable to the presence of buried petroleum deposits. The method comprehends the provision of definite means whereby surface showings of hydrocarbons lead the interpreter to conceptions otherwise impossible to attain.

A further object of the invention resides in the provision of a method of obtaining data on subsurface formations which is usually very difficult to definitely outline, such as salt domes, and the like by means of reconnaissance lines surveyed in one or more directions from a common point, taking samples at predetermined stations along such lines, analyzing such samples for non-gaseous hydrocarbons and finally in charting the findings of such analyses for interpretation and mapping the structure.

My invention also comprehends a method by which an outline of an oil field, or petroleum deposit, may be determined with substantial accuracy by locating a sufficient number of related points indicative of a perimeter or the position of a fault line.

To better clarify the description of the method herein mentioned certain illustrative figures are shown in the drawings herewith and are referred to as follows.

Figure 1:
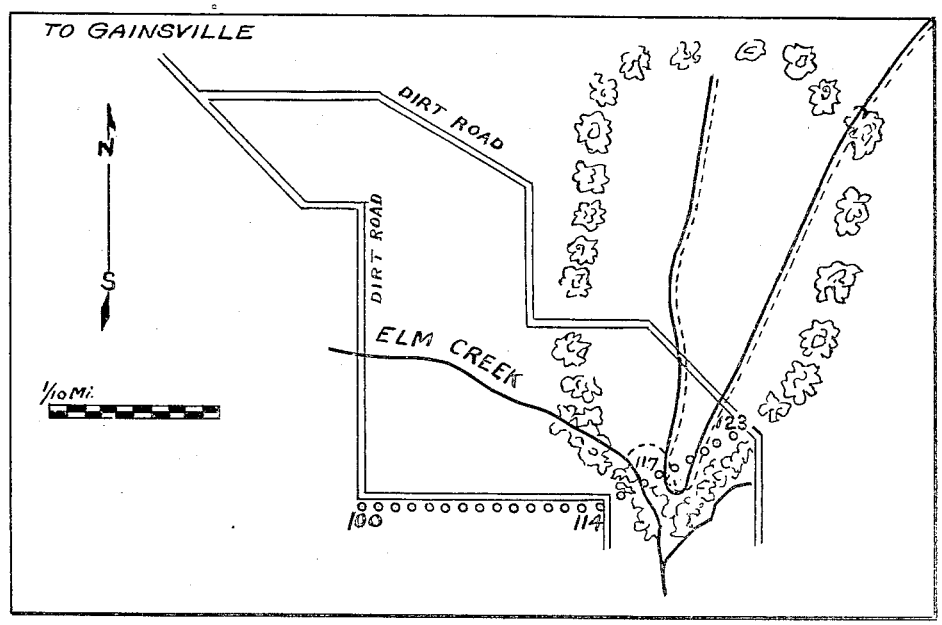
Figure 1 illustrates a regional map of an area through which a one line reconnaissance survey has been run, the several sampling stations along which are indicated by small circles and numbered from 100 to 123, the map indicating a fault zone across which the said reconnaissance survey runs.

I have learned, through extensive experimentation, that the presence of hydrocarbons in surface or near-surface soil strongly indicates the existence of hidden petroleum deposits, the location of which is difficult of determination by ordinary known geological and geophysical methods. This is especially true respecting the heavier hydrocarbons such as those falling within the more complex group or liquid, semi-solid or solid classifications, the gaseous hydrocarbons, such as methane and ethane, being of lesser importance in indicating the presence of petroliferous deposits, and of little or no value insofar as soil analysis is employed, that is, when the actual soil is analyzed for the purpose of determining the relative quantity of hydrocarbons which point more conclusively toward a petroleum deposit. It is possible to detect the presence of such deposits with absolute accuracy, even though such deposits are of inconsequential quantities, and the application of the herein described method may be summed up in the following manner:

(a) Hydrocarbons from oil and gas deposits are known to constantly filter upwardly through the earth, regardless of depth or occurrence of supposed impervious formations. This upward movement naturally follows somewhat the paths of least resistance, and is thus more detectable at points where faulting, folding or other subsurface abnormalities exist.

(b) From soil samples systematically taken at or near the surface laboratory analyses can be made which indicate relatively the quantitative non-gaseous hydrocarbon value of each.

(c) Through carefully perfected means of interpretations, these relative findings can be plotted and correlated with sample stations on the surface in such a way as to indicate geological structure and the presence of petroleum below.

It is very probable that showings of hydrocarbons will be continuous, even though infinitesimal, irrespective of the type or substance of the soil or the formation over which it lies, and such hydrocarbons are continually migrating upwardly to the earth's surface. If the samples are properly taken at the sampling stations weathering will not interfere with the normal hydrocarbon showings. Such samples when taken, however, should be segregated by placing them in separate containers, such as Cellophane envelopes, glass jars, or the like, preferably impervious to moisture in order to preserve the same and insure best results in laboratory analyses.

In carrying out my invention I first establish with reference to the geological formation to be studied, and which is supposedly favorable for the accumulation of petroleum deposits, a reconnaissance line on the surface of the ground the layout of which is aided by the map covering the general area in which the formation under study is located. This line may be designated a pattern line so positioned and of such a length that it crosses over the geological closure, structural change, or anomaly in the geological formation which defines one edge of the trapped oil pool, so that the spaced soil samples selected along said line will be taken from both sides of such closure.

Figure 2:
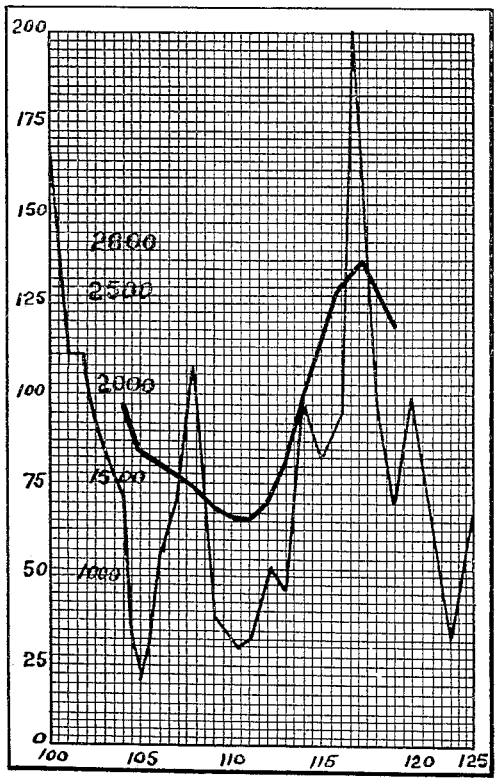
Figure 2 illustrates a graphic record used in interpreting the laboratory findings of hydrocarbons from soil samples taken in the reconnaissance survey shown in Figure 1.

If possible I prefer that this reconnaissance line be of such length that it will traverse both edge closures of such formation so that the collection of soil samples when analyzed will show by their plotted hydrocarbon variations indications of such anomalies at opposite sides of the oil deposit and across the same. I have discovered that the anomalies of oil bearing structures which serve to trap the oil and define the edges of an oil pool are usually such that soil samples approximately above such closures will show pronounced differences in hydrocarbon values to those of the adjacent samples such as the maxima curve above the abscissa 4 and 20 on Figure 4, and 40 and 46 on Figure 5, which delineate the approximate boundaries of the field on the grid or pattern lines crossing the field in the N—S and E—W directions respectively.

Where it is desired to determine the possible productivity of an area as influenced by a fault the pattern or reconnaissance line is extended, as shown in Figure 1, for a sufficient distance to cross the geological anomaly and the charting of the hydrocarbon analyses of the various samples indicated by the curve above the abscissa 117, on Figure 2, the approximate position of the geological closure created by the fault the location of which may be fixed on the map of the general area under observation within fairly close limits as shown in Figure 1, especially as one is aided in the interpretation of this particular reading by the recorded hydrocarbon analyses of the samples preceding it, say from 105 to 115, and those following it on out to sample 123, as shown in Figure 2.

Figure 6:
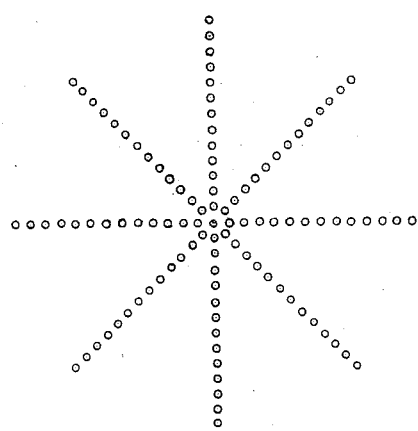
Figure 6 is an example of a radial survey as the same would appear on a map of an area under consideration, illustrating the several lines of sample stations crossing at a common point or extending radially from a common point.

As much detail data as desired may be obtained by laying out additional survey lines according to a predetermined pattern, either in parallel relationship and suitably spaced or by radiating the said lines from a common point selected in the area to be surveyed, as illustrated in Figure 6. When radial lines are deemed more expedient to the particular type of survey required it is desirable, after it has been determined that certain abnormalities in the hydrocarbon showings are noted at any given point, to lay out such lines in each direction radially from that point and to such a distance as may be deemed necessary to accomplish a satisfactory survey of the entire area and as a means to develop the definite outlining of suspected salt domes, anticlines, and similar features of the subsurface structure. The former method, that is, the laying out of one or more parallel line-tests, may be referred to as grid surveys and which are used only on special occasions where it is desired to have a detailed picture of areas which have been indicated to be on structure from other previous studies.

Figure 7:
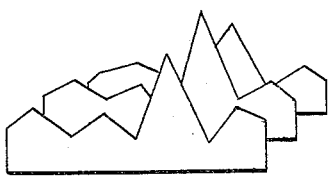
Figure 7 represents an interpretation of a series of parallel line-tests which have been correlated to definitely define a fault structure.

The soil samples are preferably taken at about every one-tenth mile along the line-test which may run, in some instances, from five to twenty miles depending upon the area to which the science is to be applied and over which a survey is desirable. By systematically taking such samples it can be seen readily that a uniform showing may be had when two or more of the line-tests are laid parallel across the area and the sampling stations from which soil samples are taken are correlated in a manner illustrated in Figure 7.

Figure 4:
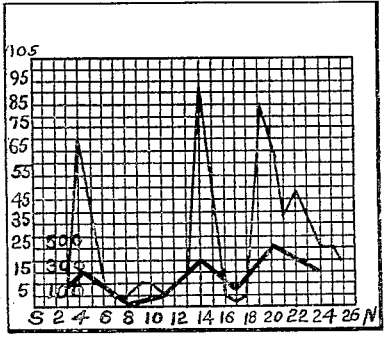
Figure 4 is a graphic record of the laboratory findings taken along the north-south line-tests shown in Figure 3.
Figure 5:
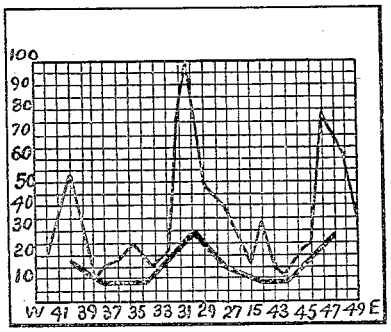
Figure 5 is a graphic record made for interpretative work from laboratory analyses of soil samples taken along the east-west line-test shown in the map in Figure 3.

Under extraordinary circumstances the line-tests may be taken one-twentieth of a mile apart instead of one-tenth of a mile, as in other type surveys, in order that a more detailed correlation will result enabling the interpreter to more closely study the showings, that is, the graph upon which the relative showings are indicated, as in Figures 2, 4 and 5, whereby such showings may be more definitely correlated indicating structures other than conventional faults, or the like, which usually occur on a substantially straight line.

The line-tests are predetermined as to direction by the aid of a compass where possible but may require the use of the engineer's transit where rough terrain is encountered and where the ordinary compass does not suffice to properly direct the crews assigned to this work. In any case scientific accuracy is rigidly maintained. The distance between the sampling stations which are predetermined along the line-tests is usually determined by instruments but may be measured by pacing.

Figure 3:
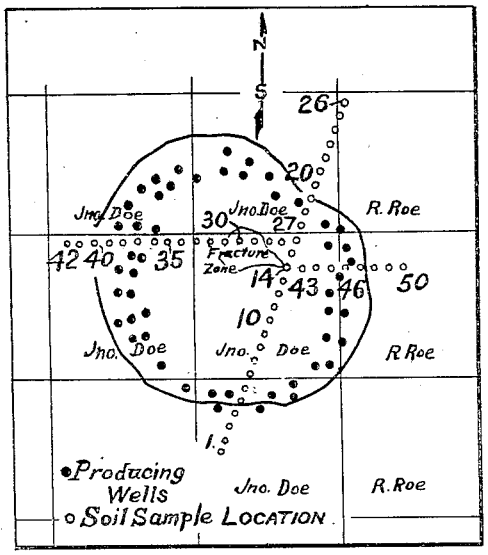
Figure 3 is a field map illustrating a salt dome and showing line-tests and soil sampling stations along such line-tests and illustrating the manner in which the subsurface structure is determined.

A map is ordinarily constructed of the area over which the survey is to be made prior to the survey of the line-tests noting such important markers as highways, creeks, or rivers, tree lines, and all other surface indications which will be useful in later interpretation work and such line-tests are noted upon the maps by a line of circles properly spaced and numbered, the said circles representing sample stations, as illustrated in Figures 1 and 3.

The sample is usually taken from what is ordinarily termed the subsoil, that is, by first removing the crust or the surface of the earth and then taking, by means of a mason's "jack" or a geologist's hammer, or like instrument, a quantity of soil which may be molded by the hand into substantial oval shape, wrapped in an envelope of material preferably impervious to air and moisture to isolate and preserve the same, and properly marked as to sample station number and other data which may be useful in the laboratory for the tests to which it is thereafter subjected. The soil so taken may be placed in glass jars or other suitable containers, for proper preservation although it is not especially necessary to prevent the sample from coming into contact with the atmosphere. Such samples, when taken, are sometimes very moist and unless placed in some container impervious to moisture will cause such container to disintegrate and permit the commingling of the samples.

In certain areas it is sometimes desirable to obtain such samples at a greater depth than from the subsoil and it may be desirable, in such cases, to utilize an auger bit of medium size for soil boring which is directed into the ground to the desired depth to bring out the soil in the quantities desired, and by placing extensions on the auger used the same may be utilized from boats in near-coastal surveys, across lakes or other regions inundated by water. It is necessary, however, to use caution and exactness in obtaining the soil samples for analysis and great care is exercised in obtaining such samples and properly preserving the same for the final laboratory tests.

As stated, however, the samples may ordinarily be taken at or a few inches beneath the surface of the ground and, except in instances where a heavy surface formation of rock or vegetation, such as grass roots, and the like, is prevalent, samples taken at such a depth may be found entirely satisfactory but where it is necessary to take such samples several inches below the surface an auger, such as that previously described, or other suitable instrument, may be employed. In most instances it is contemplated that the samples may be taken after the outer crust of the earth is removed and which crust is very commonly only a fraction of an inch in thickness.

After the samples are taken and properly identified they are delivered to the laboratory for the purpose of determining the non-gaseous hydrocarbons present therein which may be noted by the chemist opposite the identifying indicia previously placed upon the sample by the operator acquiring the same in properly tabulated or graphic form to be finally graphed and charted for interpretation.

Obviously, the sensitivity of hydrocarbon showings will vary in different geographic areas. In regions where thick sections of dense or impervious beds underlie the sedimentary formations containing petroleum, the sensitivity of the showings at the surface would be expected to be much less than in areas where the lithology is more favorable to upward migration. Thus, laboratory procedure may be varied somewhat in different regions where such showings may be more prominent than in others.

In taking the samples it is advisable always to exercise care in selecting such samples so that ordinary "contaminations" such as motor drippings and exhaust fumes, along public highways, and other "surface deposited" hydrocarbons such as might exist near pipelines, oil fields where wells are permitted to flow "wild," and refiners, and the like.

Such surface deposited hydrocarbons are referred to as "absorbed" hydrocarbons and are thus distinguished from the "adsorbed" hydrocarbons which are regarded as indications of hidden petroleum deposits and are the result of years of migration to the earth's surface from subterranean formations. The "adsorbed" hydrocarbons are those considered herein and while both, the "absorbed" and "adsorbed" hydrocarbons, are extracted by the hereindescribed process, only the "adsorbed" hydrocarbons are finally considered as definite indicators of a petroleum deposit.

Laboratory tests may be accomplished by one of several processes usually employed in geochemical analyses which may be applied by the gravimetrical, volumetrical or the colorimetrical methods, any of which may be found expedient depending upon the type of samples being under consideration. As an example of a method which I prefer for determining the relative liquid, semi-solid or solid hydrocarbon content of each sample, taken from sample to sample, I subject each to the following chemical analysis:

Each soil sample is heated to approximately 40° C. and until all of the gaseous hydrocarbons are driven off as waste materials and the soil is thoroughly dry. This process may require several hours, depending upon the condition and particular type of soil under consideration, and may be accomplished by the use of a hot water bath the temperature of which is automatically controlled and evenly maintained at about the temperature hereinbefore mentioned. With a weak solution of heated hydrochloric acid, or other corrosive, the organic minerals of vegetable origin are then dissolved out and the hydrochloric acid solution is washed out on wash filters and the remainder dried and reground to a powder.

During the second drying process, however, to which the soil is subjected it is desirable to add thereto an equal quantity of a dehydrating agent, such as freshly made calcium oxide (CaO) to insure the soil being ultra-dry for the succeeding steps of the process. After the soil is thoroughly dry and the gaseous hydrocarbons have been driven off a quantity (approximately 50 grams) of the soil sample is ground to a powder with the calcium oxide comingled therewith. The soil is then treated several hours with carbon tetrachloride ($CCl_4$) (approximately 100 c. c.) as a solvent, or other suitable solvent, to leach out the remaining hydrocarbons. It is often necessary to treat the said sample in this manner for a period of 48 hours. The best means of accomplishing this is by placing the soil, with the calcium oxide (CaO), and mixed with the carbon tetrachloride solution, in a flask having a condenser for recondensing the carbon tetrachloride as heat is applied to the flask.

The materials which have been leached out, together with the solvent are decanted preferably into a long-necked flask and sulphur (approximately 10 grams) is added and the flask is heated until the solvent (carbon tetrachloride) is driven off and heat is continued to be applied to the flask until the sulphur vaporizes. The sulphur combines, at this stage, with the hydrocarbon materials remaining in the flask under the heat treatment and the heating process is preferably continued until such time as all of the hydrocarbon materials are broken down and, due to the fact that the hydrogen is released very reluctantly, toward the end, the heat must sometimes be applied over a period of several hours. It is preferable to employ a long-necked flask of a transparent material, the long neck serving as a condenser for the vaporized sulphur which is in superfluity in order to maintain the equilibrium of the elements under treatment. Another condenser is preferably connected in the system through which medium the solvent is recovered.

To insure thorough reaction of all of the hydrocarbons passed through the system and which may not have been properly activated in the first part of the process it is desirable to provide a substantially U-shaped tube in the system wherein may be placed a quantity of sulphur or sulphur-producing compound, to which heat of a sufficient temperature is applied to vaporize the sulphur or produce sulphur vapors, and the hydrocarbons passing from the first part of the system are comingled with the sulphur vapors in the U-shaped tube to further extract the hydrogen atoms to form hydrogen sulphide gas now passing through the system and which is led through a preferably large wash bottle containing a solution of copper sulphate (CuSO4), resulting in a cupric sulphide (CuS) precipitate. The precipitate (CuS) thus obtained is accurately weighed by filtering the same on weighed filter paper and the weight thus determined will reflect relatively the hydrocarbons of the more complex group from sample to sample.

As previously stated, it is necessary to heat the elements, after the sulphur has been added, to a temperature sufficient to bring the sulphur into a nascent state to insure the proper reaction, but it is obvious that some sulphur producing compound other than sulphur yet capable of releasing sulphur in a nascent state, may be employed by which equally satisfactory results may be obtained and which will obviate the necessity of applying a substantial amount of heat to the elements. The degree of heat required to bring about a reaction between the hydrocarbons and the sulphur may vary depending upon the type of hydrocarbons present in the sample and the temperatures so required may range from 80° C. upwardly to 444° C. Some of the heavier hydrocarbons will react at much lesser temperatures than the lighter hydrocarbons and, since my method deals more specifically with the former, the degree of heat employed is preferably of the lesser order.

The foregoing process may be regarded, however, as the preferred embodiment of the system I employ in accomplishing the determinations contemplated by my method, it being obvious that other formulas and equations may be as effectively employed depending upon circumstances and conditions. For example, the entire procedure may be altered and even greatly simplified in the treatment of shale soils.

It is pointed out that only a relative determination of the hydrocarbon content of the sample is desired, from station to station, and the fact that the several members of the hydrocarbon group may vary as to quantity and characteristics in each sample need not be taken into consideration since the determination of the quantity of the precipitate by weight is a sufficiently close calculation of the hydrocarbon content of each sample upon which to base a satisfactory deduction concerning the relative value of the sample under consideration. For example, certain hydrocarbons may be known to exist in one sample but which are entirely nonexistent in another sample, each sample, however, containing certain quantities of hydrocarbons, the presence of which may be readily determined by known laboratory processes, but instead of ascertaining the identity and quantity of each hydrocarbon present in the sample my method contemplates only the determination of the presence and relative quantity of the more complex (liquid, semi-solid and solid) hydrocarbons and which are determined by the weight of the precipitate resulting from the hydrocarbons acted upon by the hydrogensulphide gas and the copper sulphate solution.

I have learned, in my experiments, that I can calculate the relative hydrocarbon content of the original soil sample, considered from sample to sample, by using the weight of the precipitate as a base, since I am interested only in determining the approximate relative quantity of the hydrocarbons in each sample and not in the determination of the particular identity of the substance. The quantity by weight of the precipitate will indicate, with reasonable accuracy, the amount of the hydrocarbons in the original sample, the weight of the precipitate depending upon the weight of the hydrocarbons originally present in each sample, so far as a sample to sample relation is concerned, such calculations being sufficiently close to afford a readable mineral curve on the graph capable of disclosing geophysical data which may lead to important information and, when correlated with another series of samples, may indicate a closure of an oil field of considerable consequence.

All of the laboratory recordings, for the sake of convenience, should be made in the metric scale by which the quantitative values of hydrocarbon content of each sample is expressed in milligrams per kilogram (0.001/1000), or parts per million but any arbitrary scale may be adopted. It is not uncommon for the hydrocarbon content to be expressed as one-millionth part of the total, or less. The hydrocarbon content is often expressed as a "mineral showing" although actually the reference to that compound as a mineral may not be correct.

For interpretative work the findings of the laboratory are recorded in a graphic form upon a coordinated chart, such as that illustrated in Figures 2, 4 and 5, along the bottom or abscissa of which are indicated the sampling stations by number while the relative quantitative values of the various samples taken are indicated on the ordinate of the graphs.

As will be noted, by reference to Figures 2, 4 and 5, the numbers of the sampling stations may run from the numeral 1 upwardly or may be indicated by any number arbitrarily selected, such as 100, 150, and so on. It will be found that such numbers will follow the series indicated upon the survey maps, as illustrated in Figures 1 and 3.

In each of these illustrations (Figures 1 and 3) I have outlined the fault zones which would be disclosed by the data obtained from the surveys already described in the event there was no previous indication of their existence. In many instances a geological survey or a geophysical survey may justify an opinion that a fault probably exists, or the latter may even be observable on the surface. However, in such cases there is no positive evidence that such geological closure has actually trapped an oil deposit and heretofore it has been necessary to rely upon drilling tests to establish these facts. Hence if Figures 1 and 3 are considered as representative of typical conditions it will be seen that the practice of my invention may also be used with considerable success to establish the correctness of a previous survey made by other methods.

It should be understood that the values along the ordinate of the illustrated graphs are expressed as relative values of hydrocarbon content and not actual measurements. If the curve which results from their plotting does not make peaks and recessions on the graph prominent enough to afford easy interpretations (as might be the case in areas where the sensitiveness of the showings are very low), all relative values are raised by a suitable common power, and replotted.

To properly clarify the laboratory findings two curves or lines are usually plotted on each graph. The first and more prominent line may be referred to as the "quantitative mineral curve," as it is plotted against the relative hydrocarbon values. This curve more prominently reflects all abnormalities in the hydrocarbon content. The second curve, commonly referred to as the "mathematical curve," indicates or reflects the mean average of the quantitative mineral curve.

The mathematical curve provides a background and check against unjustified or unaccounted for abnormalities in the so-called mineral curve and if the mean average, or mathematical curve, does not somewhat prominently reflect the same general peaks and recessions as the mineral curve justification would be lacking for regarding an individual high hydrocarbon showing as completely satisfactory. It is pointed out that in interpreting the plotted analyses that the mathematical curve should disclose that the hydrocarbon content of samples adjacent and in the vicinity of a high peak sample are sufficient to substantiate a conclusion that a petroleum deposit exists in commercial quantities in the general area, the outline and location of which may be more accurately determined by further survey and analyses as before explained.

Skilled interpreters are required to obtain from the records the significant facts which indicate the presence of structure or petroleum. The interpreter's work is not infallible, as it is possible for outside influences to enter and give misleading evidence which might otherwise have been reliable. For that reason, and others, correlative and interpretative work is made in the light of all available surface and subsurface geological knowledge. Such independent data often explains what appears to be unjustified abnormalities. Further, they may also go a long way in confirming actual geochemical findings. In entirely unexplored regions, the interpreter must rely solely upon the reflections in his quantitative mineral curve.

The basic principles followed in making interpretations from soil analysis studies are as follows:

1. Peaks or extremes which are evident on the quantitative mineral curve may point to the presence of faulting; or folding such as might occur along the edges of an anticline or monocline; or dips such as occur off of salt domes. I offer this information as my field studies and experiments with known geological structures indicate that there is greater opportunity for upward migration at these disturbed places in the earth.

2. Prominent recessions of the mineral curve across an area point to the presence of an anticline or other geological feature, as it is generally believed the dense caprock overlying deposits of petroleum will lessen the quantity of hydrocarbon showings at the surface. However, my experience teaches that such showings will persist even if in lessened quantities.

3. Where prominent peaks are recorded on the graphs at the edges of these recessions, indication is given of some sort of structure, the high relative hydrocarbon values at the peaks indicating folded or faulted edges, and the receding values indicating a tightening of the caprock probably due to mineralization, overlying the trap.

In actual interpretative work, the individual graph for the longest line-test is taken and studied with relation to its position on the surface map of the ground area covering the formation being studied. If any abnormalities are evident they are noted by proper markings. Then the graphs of other lines or radial surveys are likewise studied, and any findings marked on the map. By this process it may soon become evident that corresponding showings are being given around a common closure, or along a common path. Continued studies, correlating each line of tests, may quickly point to an easily distinguishable subsurface feature. It may become evident that additional lines of samples should be taken in certain directions. After this is done, and additional graphs prepared from these analyses, further studies may clear up important points which before were under question. Here is where a thorough knowledge of regional and local conditions enter the interpreting picture, and help to confirm or dispute the showings.

Where absolutely no relation between abnormalities of the different graphs can be established across the area surveyed, it might safely be concluded that no effective trap for the accumulation of petroleum exists below. However, if there are very prominent showings upon any of the graphs which cannot be correlated or explained by outside influences in the area, additional sampling is warranted. Theoretically, where showings are obtained which far exceed the average showings for the district, petroleum deposits are indicated as being buried in the near vicinity. Efforts are made sometimes to clear up these unusual showings by running a series of laterally directed lines or a radial survey near them.

Figure 1 shows a regional area upon which a one-line reconnaissance survey was run. The tree lines, roads, creek, and evident surface fault were all noted by the crew while taking samples. It will be seen that sampling stations began at No. 100, running due east to station 114, thence east by northeast across the known fault in the field, which was evident both on the surface and by drill holes.

Figure 3 shows a map of a salt dome area. The dark dots represent present actual producing oil wells, and the lines of small circles indicate location of sampling lines made in a reconnaissance soil survey of this area. It will be seen that the first line-test starts at the south and runs north by northeast, sampling stations being numbered from 1 to 26. The next line of samples are taken in a due east-west line, beginning at station 16, and numbered from 27 to 42. To complete the survey, the eastward line was extended from station 14, and are shown as samples 43 to 50.

Figure 4 shows the graphic records made from laboratory analyses of soil samples taken at the various stations along the north by north-east line-test, shown in Figure 3, numbered from 1 to 26. The single line indicates the quantitative mineral curve, and the heavy line marks the mathematical or mean average curve, both plotted against the station points along the abscissa. It is significant to note that peaks in the mineral curve (which are confirmed by the mean average curve) are noted on station numbers corresponding to both edges of the dome as outlined by drilling, and also in the center as the line-test crosses near the fracture zone.

Manifestly, the method herein described may be modified by persons skilled in geophysical and geochemical sciences in the course of experimental and practical application and such modifications as may be resorted to from time to time and which may be considered as falling within the spirit and intent of the method as herein outlined may also be considered as falling within the scope of the appended claims.

What is claimed is:

1. In the art of geological exploration, the method of locating petroleum deposits which comprises systematically collecting a series of samples of surface soil at spaced locations, extracting from said samples the solid, petroleum derived constituents which are soluble in carbon tetrachloride, measuring the relative amounts of said constituents and tabulating said measurements with respect to the original location of the samples.

2. In the art of exploration for underground hydrocarbon deposits, the steps which comprise systematically collecting a series of samples of surface soil at spaced locations, extracting said samples separately with an organic solvent for solid, petroleum-derived constituents present initially in said samples in soluble form, and measuring the relative amounts of said constituents thus extracted whereby said underground hydrocarbon deposits can be located.

ROBERT O. SMITH.